US006615106B2

(12) United States Patent
Soto et al.

(10) Patent No.: US 6,615,106 B2
(45) Date of Patent: Sep. 2, 2003

(54) PRINT AND APPLY LABEL MACHINE

(75) Inventors: Wilfredo Soto, West Chester, PA (US); David DeLuca, Reading, PA (US); Adam Schaller, Stowe, PA (US)

(73) Assignee: Illinois Tool Works Inc., Glenview, IL (US)

( * ) Notice: Subject to any disclaimer, the term of this patent is extended or adjusted under 35 U.S.C. 154(b) by 116 days.

(21) Appl. No.: 09/940,725

(22) Filed: Aug. 28, 2001

(65) Prior Publication Data

US 2003/0041973 A1 Mar. 6, 2003

(51) Int. Cl.[7] .......................... G06F 7/00; G06F 17/00; B32B 31/00

(52) U.S. Cl. ........................ 700/235; 700/227; 156/539

(58) Field of Search ................................ 700/227, 235; 156/539, 541, 542

(56) References Cited

U.S. PATENT DOCUMENTS 3,238,080 A * 3/1966 Schluter .................... 156/351
4,844,771 A 7/1989 Crankshaw et al.
5,421,948 A 6/1995 Crankshaw et al.
5,645,669 A 7/1997 Crankshaw et al.
5,785,798 A * 7/1998 Horsman et al. ........... 156/361
5,988,251 A 11/1999 Hunt et al.

OTHER PUBLICATIONS

Sales Literature, CLM Model CPA–350 Thermal–Transfer Printer/Applicator, Apr. 7, 2000 Quick Label Systems.

* cited by examiner

*Primary Examiner*—Christopher P. Ellis
*Assistant Examiner*—Gene O Crawford
(74) *Attorney, Agent, or Firm*—Schwartz & Weinrieb

(57) ABSTRACT

Apparatus for applying labels to surfaces of packages, cartons, or boxes comprises a single rotary arm which is capable of being operated in accordance with two different operational modes. In accordance with a first mode, two separate labels are applied to two different mutually perpendicular surfaces of the package, carton, or box, while in accordance with a second one of the two different operational modes, a single label is applied to the two different mutually perpendicular surfaces of the package, carton, or box as a result of being wrapped around a corner region of the package, carton, or box.

24 Claims, 4 Drawing Sheets

PRINT AND APPLY LABEL MACHINE

FIELD OF THE INVENTION

The present invention relates generally to an apparatus or machine for applying labels to packages, boxes, cartons, or the like, which are being conveyed along a predetermined conveyor path by means of a suitable conveyor mechanism, and more particularly to a new and improved apparatus or machine, for applying labels to packages, boxes, cartons, or the like, which are being conveyed along a predetermined conveyor path by means of a suitable conveyor mechanism, wherein the apparatus or machine comprises a single rotary arm mechanism which is capable, in accordance with a first one of two operative modes, of serially applying two separate labels to two mutually perpendicular surfaces of the package, box, carton, or the like, in accordance with a tamp or touch-contact application mode, and alternatively, is capable, in accordance with a second one of the two operative modes, of applying a single label in a wrap-around manner with respect to a corner location of the package, box, carton, or the like, such that two separate and longitudinally spaced printed portions of a single label can be disposed upon two mutually perpendicular surfaces of the package, box, carton, or the like, in accordance with a combination tamp/touch-contact application mode and a slidable/wipe-on application mode.

BACKGROUND OF THE INVENTION

Currently, a number of companies manufacture apparatus, machines, mechanisms, or the like, which can apply labels to packages, cartons, boxes, or the like, which are being conveyed along a predetermined conveyor path by means of a suitable conveyor mechanism. More particularly, one type of apparatus, machine, mechanism, or the like, can serially apply two separate labels to two mutually perpendicular surfaces of the package, box, carton, or the like, or alternatively, another type of apparatus, machine, mechanism, or the like, can apply a single label in a wrap-around manner with respect to a corner location of the package, box, carton, or the like, such that two separate and longitudinally spaced printed portions of a single label can be disposed upon two mutually perpendicular surfaces of the package, box, carton, or the like.

Examples of such conventional apparatus, machines, mechanisms, and the like, are disclosed within U.S. Pat. No. 5,988,251 which issued to Hunt et al. on Nov. 23, 1999, U.S. Pat. No. 5,645,669 which issued to Crankshaw et al. on Jul. 8, 1997, U.S. Pat. No. 5,421,948 which issued to Crankshaw et al. on Jun. 6, 1995, and U.S. Pat. No. 4,844,771 which issued to Crankshaw et al. on Jul. 4, 1989. As can be readily appreciated, however, from a review of such PRIOR ART, none of the disclosed and patented apparatus, machines, mechanisms, or the like, can achieve all of the aforenoted various different operational modes. For example, while the apparatus, system, or mechanism of Hunt et al. is capable of applying labels to two mutually perpendicular surfaces of a box, package, carton, or the like, such apparatus, system, or mechanism is lacking any means which is capable of achieving the application of a label onto a corner region of the box, package, carton, or the like, in a wrap-around mode. In addition, there is also no means for permitting adjustment of the label applicator with respect to the surfaces of the package, box, carton, or the like upon which the labels are being applied such that the labels can be applied at different locations along a particular surface of the package, box, carton, or the like in order to effectively correlate the disposition of the label with existing graphics, logo designs, and the like, already incorporated upon a side surface of the package, box, carton, or the like.

In a similar manner, while the apparatus, system, or mechanism of Crankshaw et al., as disclosed within U.S. Pat. Nos. 5,645,669 and 5,421,948, both enable the application of a single label onto a corner region of an article in a wrap-around mode, such apparatus, system, or mechanism is lacking any means which is capable of achieving the application of separate labels onto mutually perpendicular surface portions of the article. In addition, it is also noted that the labels of the Crankshaw et al. apparatus, system, or mechanism are applied by means of a roller applicator as opposed to a tamp-type label applicator which is significantly less complex and easier to manipulate and control in connection with the actual transfer and application of the label from the label carrier onto the article, package, box, carton, or the like. In connection with the lastly noted Crankshaw et al. patent, while a tamp-type label applicator is in fact disclosed for applying a label onto a surface portion of an article, package, box, carton, or the like, the apparatus, system, or mechanism of Crankshaw et al. lacks any means for applying labels to two mutually perpendicular surfaces of such article, package, box, carton, or the like, as well as to a corner region of the article, package, box, carton, or the like, in a wrap-around mode.

Lastly, an apparatus, machine, or system for applying labels to two mutually perpendicular surfaces of a package, box, carton, or the like, is also known to manufactured by the Diagraph Corporation, however, again, such apparatus, machine or system is incapable of applying a single label to a corner region of the package, box, carton, or the like, in a wrap-around mode. In addition, the actuator mechanism for applying the labels to the two mutually perpendicular surfaces of the package, box, carton, or the like, is relatively complex in that it comprises the mounting of a label applicator upon a rotary arm, and in turn, the mounting of the rotary arm upon a linearly extensible-retractible platform or support member.

A need therefore exists in the art for a new and improved apparatus or machine, for applying labels to packages, boxes, cartons, or the like, which are being conveyed along a predetermined conveyor path by means of a suitable conveyor mechanism, wherein the apparatus or machine would be relatively simple in that the same would comprise a single rotary arm mechanism which would be capable, in accordance with a first one of two operative modes, of serially applying two separate labels to two mutually perpendicular surfaces of the package, box, carton, or the like, in accordance with a tamp or touch-contact application mode, and at different locations along such two surfaces as desired, and alternatively, would be capable, in accordance with a second one of the two operative modes, of applying a single label in a wrap-around manner with respect to a corner location of the package, box, carton, or the like, such that two separate and longitudinally spaced printed portions of a single label can be disposed upon two mutually perpendicular surfaces of the package, box, carton, or the like, in accordance with a combination tamp/touch-contact and slidable/wipe-on application mode.

OBJECTS OF THE INVENTION

Accordingly, it is an object of the present invention to provide a new and improved apparatus, mechanism, or machine for applying labels to packages, boxes, cartons, or the like, which are being conveyed along a predetermined conveyor path by means of a suitable conveyor mechanism.

Another object of the present invention is to provide a new and improved apparatus, mechanism, or machine for applying labels to packages, boxes, cartons, or the like, that are being conveyed along a predetermined conveyor path by means of a suitable conveyor mechanism, which effectively overcomes the various operational disadvantages of PRIOR ART apparatus, mechanisms, or machines for applying labels to packages, boxes, cartons, or the like that are being conveyed along a predetermined conveyor path by means of a suitable conveyor mechanism.

An additional object of the present invention is to provide a new and improved apparatus, mechanism, or machine for applying labels to packages, boxes, cartons, or the like, that are being conveyed along a predetermined conveyor path by means of a suitable conveyor mechanism, which effectively overcomes the various operational disadvantages of PRIOR ART apparatus, mechanisms, or machines, for applying labels to packages, boxes, cartons, or the like that are being conveyed along a predetermined conveyor path by means of a suitable conveyor mechanism, by enabling the application of two different labels to two different mutually perpendicular surfaces of a package, box, carton, or the like in accordance with a tamp/touch-contact application mode, as well as the application of a single label upon a corner region of the package, box, carton, or the like in accordance with a tamp/touch-contact and slidable/wipe-on application mode.

A further object of the present invention is to provide a new and improved apparatus, mechanism, or machine for applying labels to packages, boxes, cartons, or the like, that are being conveyed along a predetermined conveyor path by means of a suitable conveyor mechanism, which effectively overcomes the various operational disadvantages of PRIOR ART apparatus, mechanisms, or machines, for applying labels to packages, boxes, cartons, or the like that are being conveyed along a predetermined conveyor path by means of a suitable conveyor mechanism, by enabling a single rotary arm mechanism to apply two different labels to two different mutually perpendicular surfaces of a package, box, carton, or the like in accordance with a first tamp/touch-contact application mode, as well as enabling the single rotary arm mechanism to apply a single label upon a corner region of the package, box, carton, or the like in accordance with a second tamp/touch-contact and slidable/wipe-on wrap-around application mode.

A last object of the present invention is to provide a new and improved apparatus, mechanism, or machine for applying labels to packages, boxes, cartons, or the like, that are being conveyed along a predetermined conveyor path by means of a suitable conveyor mechanism, which effectively overcomes the various operational disadvantages of PRIOR ART apparatus, mechanisms, or machines, for applying labels to packages, boxes, cartons, or the like that are being conveyed along a predetermined conveyor path by means of a suitable conveyor mechanism, by enabling a single rotary arm mechanism to apply two different labels to different locations along two different mutually perpendicular surfaces of a package, box, carton, or the like, in accordance with a first tamp/touch-contact application mode, as well as enabling the single rotary arm mechanism to apply a single label upon a corner region of the package, carton, box, or the like in accordance with a second tamp/touch-contact and slidable/wipe-on wrap-around application mode.

SUMMARY OF THE INVENTION

The foregoing and other objectives are achieved in accordance with the teachings and principles of the present invention through the provision of a new and improved apparatus, mechanism, or machine, for applying labels to packages, boxes, cartons, or the like that are being conveyed along a predetermined conveyor path by means of a suitable conveyor mechanism, which comprises an actuator arm which is mounted upon a rotary actuator and which has a label applicator pad upon the free or distal end thereof. When, for example, two separate labels are to be applied onto two mutually perpendicular side surfaces of a package, carton, box, or the like being conveyed along the conveyor path, a first photoeye detects the presence of the package, carton, or box, and a first label is printed by means of a printer and is dispensed onto the label applicator pad. The entire system is of course controlled by means of a central processing unit (CPU), and accordingly, the actuator arm is rotated 90° in conjunction with the conveying speed of the conveyor so as to be moved into contact with the front surface of the particular package, box, or carton being conveyed by the conveyor whereby as a result of the tamp/touch-contact engagement of the label with the front surface of the package, box, or carton, the label is applied and adhered to the front surface of the package, carton, or box. The conveyor mechanism continues to convey the package, box, or carton along the conveyor path whereby the package, box, or carton tends to cause a reversal of movement of the actuator arm, however, after an extremely short predeterminedly timed period, or substantially instantaneously after the movement of the actuator arm to the extended 90° label-application position, the central processing unit (CPU) causes the rotary actuator mechanism to return the actuator arm to its home position whereupon being so detected by means of a second photoeye, a second label is printed and dispensed onto the applicator pad. As the package, carton, or box continues to advance along the conveyor, its position is sensed by means of a third photoeye whereupon the rotary actuator again activates the actuator arm such that the applicator pad, having the second label disposed thereon, is now moved into contact with a side surface of the package, box, or carton whereby as a result of an initial tamp/touch-contact engagement of an end of the label with the side surface of the package, box, or carton, the second label is applied to the side surface of the package, carton, or box in accordance with a tamp/touch-contact and slidable/wipe-on mode. As the package, box, or carton is conveyed still further, a fourth photoeye detects the presence of the package, carton, or box whereupon the actuator arm is again returned to its home position such that the label application cycle can again be repeated in connection with a subsequently conveyed package, carton, or box.

Alternatively, when, for example, a single label, having two longitudinally separated printed portions thereon, is to be applied onto two mutually perpendicular side surfaces of a package, carton, or box, or the like, which are being conveyed along the conveyor path, as a result of being wrapped around a corner region of the package, box, or carton, the operator initiates a similar but different control circuit operatively associated with the apparatus, machine, or mechanism whereby, as the particular package, box, or carton is being conveyed along the conveyor, the first photoeye again senses the presence of the package, carton, or box and accordingly initiates the printing of the label by the printer and the dispensing of the same onto the label applicator pad. The actuator arm will then be rotated 90° into the path of the oncoming package, carton, or box, and will engage the front surface of the package, carton, or box in a tamp/touch-contact mode such that, in effect, the first or leading half of the label is now adhesively secured upon the front face of the package, carton, or box.

As the conveyor continues to convey the package, carton, or box in the downstream flow direction, the actuator arm is effectively pushed back toward its retracted or home position but in fact also remains engaged in contact with the package, carton, or box. Accordingly, since the first or leading half of the label is adhesively bonded to the front face of the box, package, or carton, then as the package, carton, or box pushes the actuator arm back toward its retracted or home position, the applicator pad moves relative to the label so as to cause the label to be wrapped around the corner region of the package, carton, or box and thereby secure the second or trailing half of the label upon the side surface of the package, carton, or box in accordance with a slidable/wipe-on mode.

The package, carton, or box is then conveyed still further whereupon being sensed by the fourth photoeye, the actuator arm is returned to its home position in preparation for a subsequent label application cycle in connection with a subsequently conveyed package, carton, or box. It is noted that in accordance with the corner wrap operation cycle, the second and third photoeye sensors have effectively been operatively removed or disengaged from the control circuit, however, it can nevertheless be appreciated that in accordance with the principles and teachings of the present invention, basically the same apparatus, machine, mechanism, or system is able to be utilized to accomplish either one of the two different label application modes.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
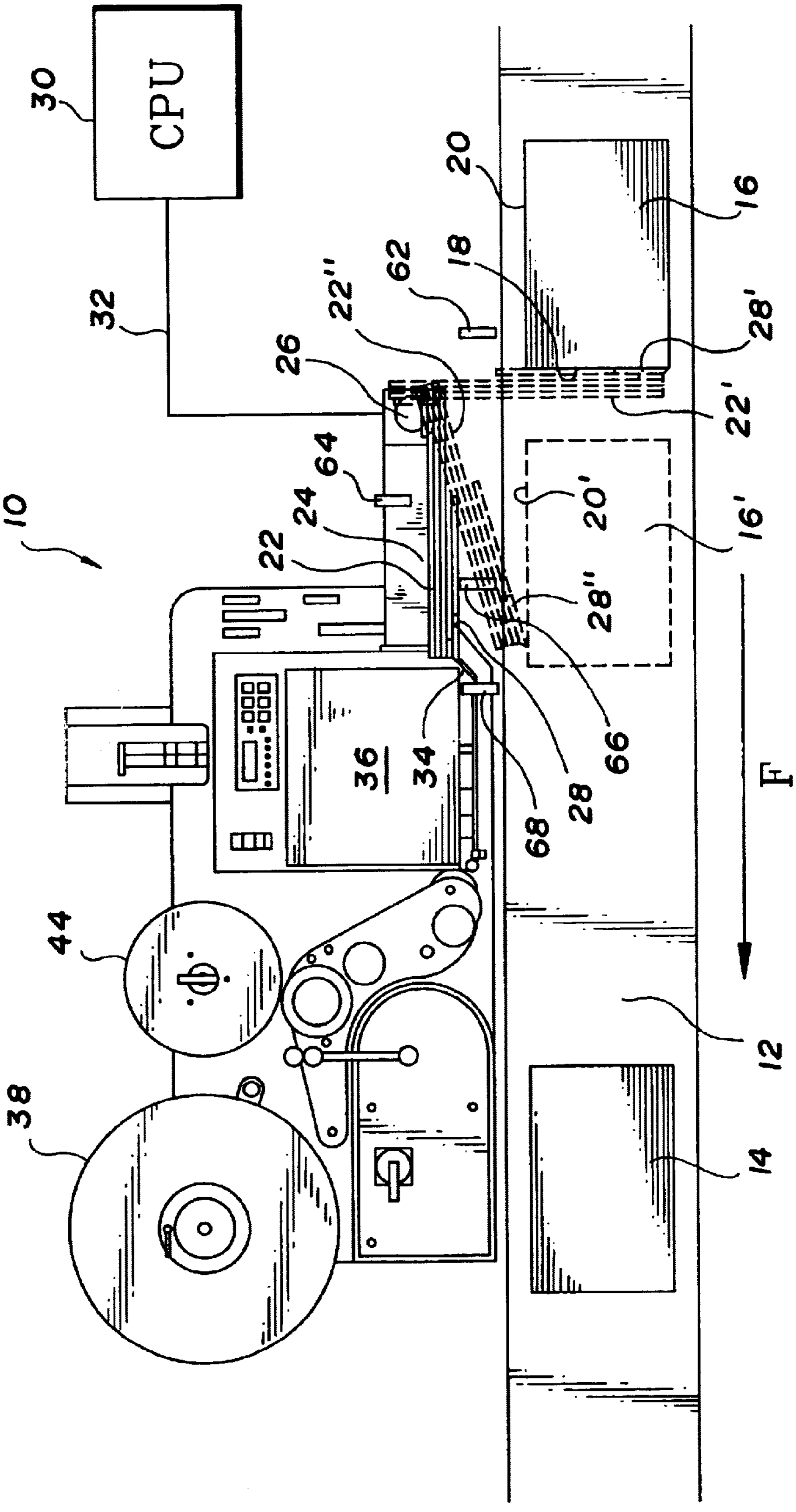
FIG. 1 is a schematic top plan view of a new and improved apparatus, machine, or system for applying labels to packages, boxes, cartons, or the like that are being conveyed along a predetermined conveyor path by means of a suitable conveyor mechanism, wherein the actuator arm of the apparatus, machine, or system is schematically illustrated as being disposed at its two operative positions so as to achieve the dual-tamp/touch-contact application of two separate labels upon, for example, front and side surfaces of a conveyed package, box, or carton.

Referring now to the drawings, and more particularly to FIG. 1 thereof, a new and improved apparatus, machine, or system, for applying two separate labels onto two mutually perpendicular surfaces of a package, carton, box, or the like, being conveyed along a conveyor mechanism, or alternatively, for applying a single label onto a corner region of the package, carton, or box in a wrap-around mode such that two longitudinally separated printed indicia areas of the single label will be respectively disposed upon the aforenoted mutually perpendicular surfaces of the package, carton, or box, has been constructed in accordance with the principles and teachings of the present invention and is accordingly disclosed and generally indicated by the reference character 10. A conveyor mechanism 12 is adapted to convey a plurality of packages, boxes, cartons, or the like, therealong in a flow direction F, wherein, for example, a downstream package, carton, or box, which has already had labels applied to, for example, front and side surfaces thereof by means of the apparatus, machine, or system 10 of the present invention, is disclosed at 14, while an upstream package, carton, or box, to the front and side surfaces of which labels are being applied by means of the apparatus, machine, or system 10 of the present invention, is disclosed at 16. More particularly, the front surface of the package, carton, or box 16 to which a first one of two separate labels is to be applied is denoted at 18, while a side surface of the package, carton, or box 16 to which a second one of the two separate labels is to be applied is denoted at 20. In order to implement the actual application of the labels onto, for example, the mutually perpendicular front and side surfaces 18,20 of the package, carton, or box 16, an actuator arm 22 has a proximal end portion thereof pivotally mounted upon a fixed mounting bar 24 by means of a rotary actuator assembly 26, while a distal end portion of the actuator arm 22 has a label applicator pad 28 fixedly mounted thereon. The rotary actuator assembly 26 controls the angular disposition of the actuator arm 22, and the activation or energization of the rotary actuator assembly 26, as well as the activation or energization of all of the operative components of the apparatus, machine, or system 10, is controlled by means of a central processing unit (CPU) 30. It is noted that for clarity and brevity purposes that the central processing unit (CPU) 30 has been illustrated as being operatively connected to the apparatus, machine, or system 10, and in particular to the rotary actuator assembly 26, by means of a single signal line 32, however, in reality it is to be understood and appreciated that each operative component of the apparatus, machine, or system 10 will be operatively connected to the central processing unit (CPU) 30 by means of its own signal line.

When the actuator arm 22 is disposed at a HOME position, it is seen that the label applicator pad 28 is disposed adjacent to and aligned with a label dispensing station 34 of a label printer 36 so as to be readily capable of receiving a label dispensed from the label printer 36. As will be discussed further hereinafter, the label is adapted to be adhered to the external surface of the label applicator pad 28 by means of a low pressure vacuum suction system. In order to serially provide labels to the label printer 36 for the printing of a particular label, and for the subsequent dispensing of the labels from the label dispensing station 34, label stock material is conveyed along a label stock material conveyance path which will be briefly described, however, it is to be noted and appreciated that the conveyance or dispensing system for conveying or dispensing such label stock material in conjunction with the label printer 36 is conventional and does not form an actual part of the inventive concepts and structural system 10 comprising the present invention.

Figure 2:
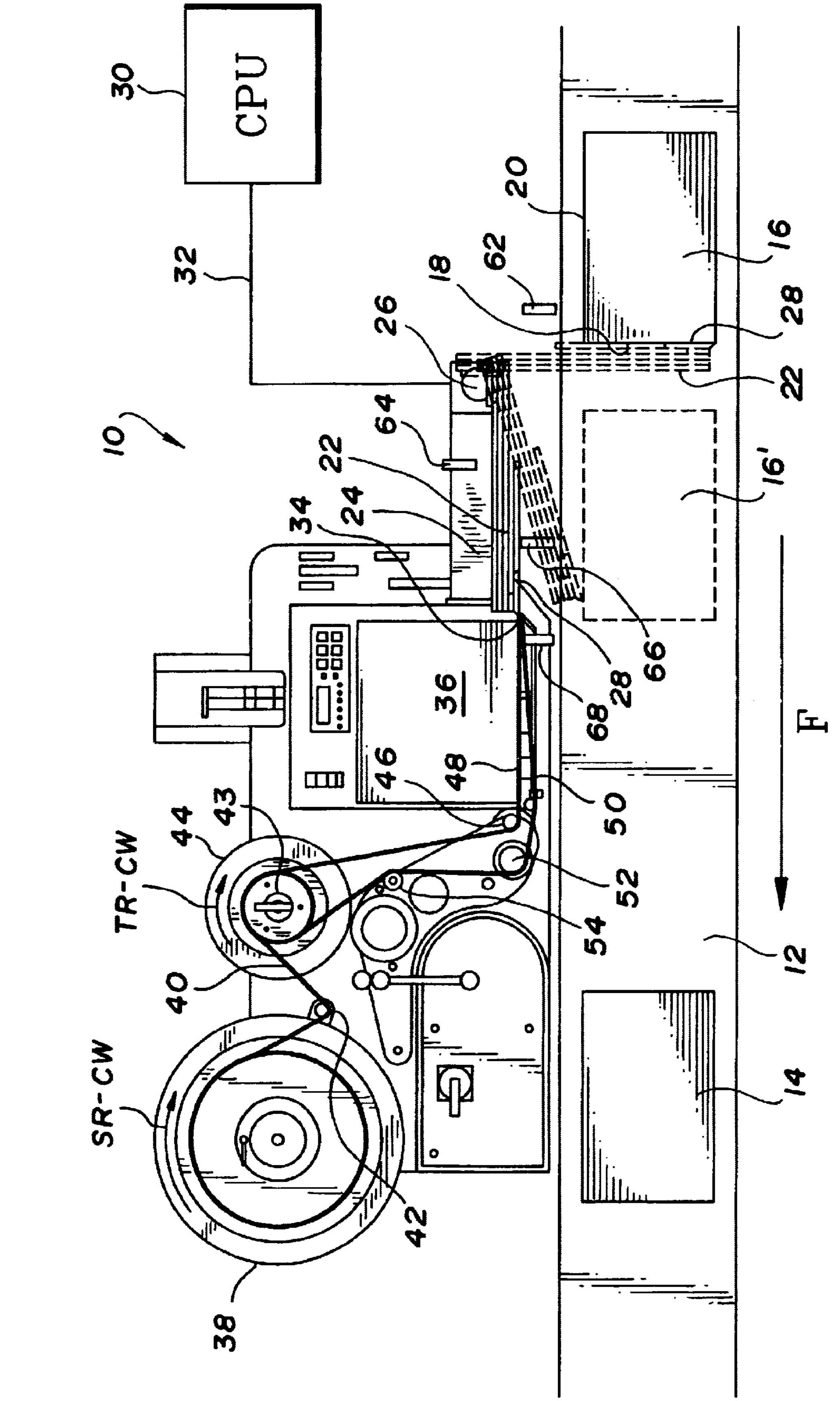
FIG. 2 is a schematic top plan view similar to that of FIG. 1 wherein the flow path of the label stock material, in conjunction with the label printer component of the overall label application apparatus, machine, or system, is additionally disclosed.

More particularly, briefly, and as best seen from FIG. 2, a supply of new or fresh label stock material is initially wound upon a supply reel 38 which is adapted to be rotated in the clockwise direction as denoted by means of the arrow SR-CW, and the new or fresh label stock material 40 is then dispensed from the supply reel 38 so as to be routed beneath a dancer roller 42 and around a take-up spool 43 of a take-up reel 44 which is also rotated in the clockwise direction as denoted by means of the arrow TR-CW. From the take-up spooll 43 of the take-up reel 44, the unwound or dispensed label stock material 40 is conveyed around a guide roller 46 so as to effectively be fed along a path 48 which is disposed parallel to the front face of the label printer 36 and which of course extends through the printer 36 such that predeterminedly desired labels are able to be printed by means of a suitable label printer mechanism, not actually shown, which is housed within the label printer 36. The label stock material 40 comprises a plurality of label substrates adhered to a liner or backing member, and accordingly, after a particular label indicia has been printed upon a particular label substrate so as to effectively define a label which is to be deposited and adhered upon a surface or corner region of one of packages, boxes, or cartons 14,16, the label stock material 40 reaches the label dispensing station 34 at which point or location a knife blade or similar implement, not actually shown, effectively strips the printed label from the liner or backing member.

Figure 3:
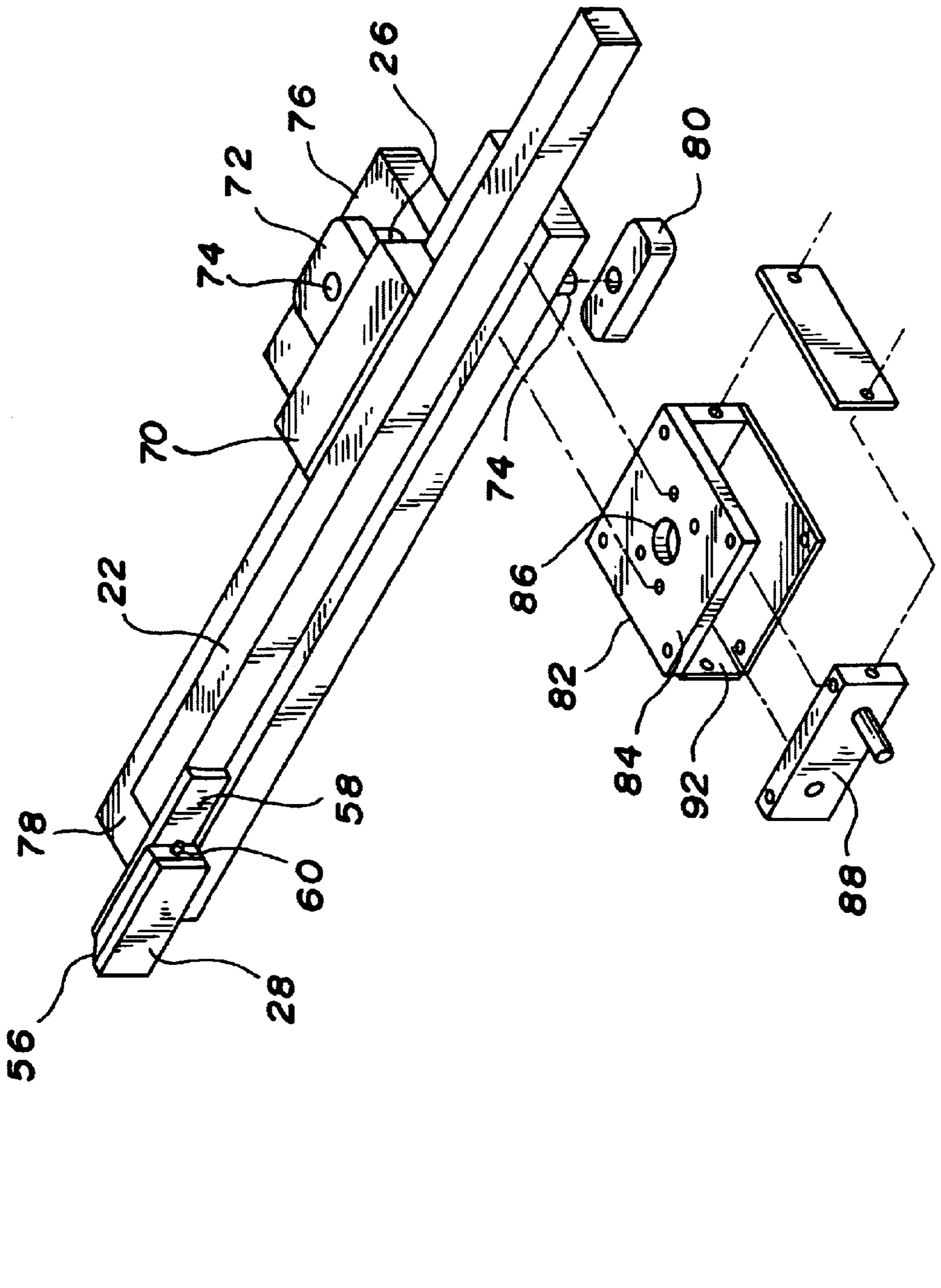
FIG. 3 is an exploded view of the rotary actuator and actuator arm assembly of the apparatus, machine, or system disclosed within FIGS. 1 and 2.

The printed label continues in effect along the flow path 48 and is dispensed onto the label applicator pad 28 fixedly mounted upon the actuator arm 22 which is at this time disposed at its HOME position, however, the liner or backing member is routed 180° around a guide roller, not shown, located immediately adjacent to the label dispensing station 34 such that the liner or backing member is now conducted along a flow path 50 which is disposed substantially parallel to the flow path 48. The liner or backing member is further routed around a guide pulley or roller 52 and a deflection roller 54 such that the leading end of the liner or backing member is secured upon the take-up spool 43 of the take-up reel 44. It is to be noted that as the fresh supply of label stock material 40 is routed over or around the take-up spool 43 of the take-up reel 44 so as to be conveyed toward the guide roller 46, such fresh supply of label stock material 40 is actually conducted around the external surface portion of the leading edge portion of the liner or backing member being wound around or upon the take-up spool 43 of the take-up reel 44. In addition, as has also been noted hereinbefore, in order to adhere the particular label upon the label applicator pad 28, vacuum conditions are to be imparted to the label applicator pad 28. Accordingly, the label applicator pad 28 is mounted upon a vacuum support plate 56 which is best seen in FIG. 3, and the vacuum support plate 56 is in turn mounted upon a label applicator pad mounting plate 58 which is mounted upon the actuator arm 22. The vacuum support plate 56 is fluidically connected to the label applicator pad 28 and is accordingly provided with an air connection 60 by means of which vacuum conditions can be imparted to the vacuum support plate 56 and the label applicator pad 28.

With reference again being made to FIG. 1, in order to properly implement the various operative modes of the apparatus, machine, or system 10 constructed in accordance with the principles and teachings of the present invention so as to achieve both the application of separate labels upon, for example, the front and side surfaces 18 and 20 of a package, carton, or box 16, as well as the application of a single label, having two lontitudinally spaced label indicia portions printed thereon, upon a corner region of the package, carton, or box 16 whereby a first label portion would be applied to the front surface 18 of the package, carton, or box 16, while a second label portion would be applied to the side surface 20 of the package, carton, or box 16, the apparatus, machine, or system 10 of the present invention comprises the utilization of two different control circuits through means of the central processing unit (CPU) 30 in order to suitably control the rotary actuator 26 and the actuator arm 22 controlled thereby. More particularly, in conjunction with the use of the apparatus, machine, or system 10 for applying two separate labels upon, for example, the front and side surfaces 18 and 20 of a package, box, or carton, the control system comprises the use of a first photoeye or similar detector or sensor 62 which is located at a first position upstream of the rotary actuator 26 as considered in the flow direction of the packages, boxes, or cartons 16 along the conveyor 12. First photoeye or sensor 62 will detect the presence of, for example, the package, carton, or box 16 as the same is conveyed in the downstream direction F by means of the conveyor 12. A second photoeye or similar detector or sensor 64 detects the presence of the actuator arm 22 when the same is disposed at its HOME position such that the label applicator pad 28 is disposed adjacent to and aligned with the label dispensing station 34. A third photoeye or sensor 66 is disposed downstream from the first photoeye or similar sensor 62, as considered in the direction F in which the packages, cartons, or boxes 16 are conveyed, and is provided to detect the presence of the box, package, or carton 16 as the same moves from the solid line position illustrated in FIG. 1 toward the dotted line position illustrated in FIG. 1 at 16'. Lastly, a fourth photoeye or similar sensor 68 is disposed downstream from the third photoeye or similar sensor 66, as considered in the direction F in which the packages, cartons, or boxes 16 are conveyed, and is provided to detect the presence of the box, package, or carton 16 as the same moves further downstream from the dotted line position illustrated in FIG. 1.

The operational sequence of the apparatus, machine, or system 10 for applying two separate labels upon, for example, the front and side surfaces 18 and 20 of a package, box, or carton 16 will now be described. It is to be remembered as has been noted hereinbefore that, for example, the label printer 36, the rotary actuator 26, and the photoeye or similar sensors 62,64,66,68 are all of course operatively connected to the central processing unit (CPU) by means of suitable signal lines, not shown, such that interactive communication between such apparatus, machine, or system components is always being effected.

Accordingly, as the package, carton, or box 16 is conveyed in the downstream direction F by means of the conveyor 12, the front surface edge or corner region of the package, carton, or box 16 as defined between the front surface 18 and the side surface 20 of the package, carton, or box 16 will be detected by means of the first photoeye or similar sensor 62. As a result of such detection of the front edge portion of the package, carton, or box 16, a signal is sent to the central processing unit (CPU) 30 by the first photoeye or similar sensor 62, and in response to such signal, the central processing unit (CPU) 30 issues a command signal to the label printer 36 to print and dispense a first label. The first label is thus dispensed and conveyed onto the label applicator pad 28. Since this operational cycle is concerned with the application of two relatively short labels upon the respective front and side surfaces 18, 20 of the package, carton, or box 16, the first label is dispensed onto that portion of the label applicator pad 28 which is disposed immediately adjacent to the label printer dispensing station 34 and is adhered upon the label applicator pad 28 by means of the aforenoted vacumm conditions which have been impressed upon the label applicator pad 28. After a predeterminedly short timed period which is sufficient to dispense the first label from the label printer 36 and convey the same onto the label applicator pad 28, the central processing unit (CPU) 30 issues a second command signal activating the rotary actuator 26 whereby the actuator arm 22 is pivoted or rotated through an angular displacement of 90° so as to be moved from its HOME position illustrated at 22 to its first tamp/touch-contact position illustrated at 22' at which the actuator arm 22' and the label applicator pad 28' will be disposed in contact engagement with the front surface 18 of the package, carton, or box 16 such that the first printed label will now be engaged with, applied to, and adhered upon the front surface 18 of the package, carton, or box 16.

As the package, carton, or box 16 continues to be conveyed downstream in the flow direction F by means of the conveyor 12, the package, carton, or box 16 will tend to begin pivotal or rotational movement of the actuator arm 22 from its extended position illustrated at 22' back toward its HOME position illustrated at 22, however, after the actuator arm 22 has been moved from its HOME position illustrated at 22 to its extended position illustrated at 22' by means of the rotary actuator 26 under the command influence of the central processing unit (CPU) 30 so as to achieve the first tamp/touch contact application of the first label upon the front surface 18 of the package, carton, or box 16, the central processing unit (CPU) 30 will, after another predeterminedly short timed period issue another command to the rotary actuator 26 so as to cause the same to actually move the actuator arm 22 from its extended position illustrated at 22' back to its HOME position illustrated at 22. At this time, the second photoeye or similar sensor 64 detects the presence or disposition of the actuator arm 22 at the HOME position, issues a signal to this effect to the central processing unit (CPU) 30, and in response to receiving such signal from the second photoeye or similar sensor 64, the central processing unit (CPU) 30 instructs the label printer 36 to print the second label and dispense the same onto the label applicator pad 28 of the actuator arm 22.

Subsequently, after another predeterminedly short timed period, by which time the package, carton, or box 16 has moved from its solid line position 16 to its dotted line position 16', the central processing unit (CPU) 30 issues a new command signal to the rotary actuator 26 so as to again pivot or rotate the actuator arm from the HOME position illustrated at 22 to the newly extended position now illustrated at 22" at which the second label, disposed upon the label applicator pad 28", is moved into engagement contact with the side surface 20' of the package, carton, or box 16'. As a result of such engagement contact of the label applicator pad 28" with the side surface 20' of the package, carton, or box 16', the second printed label will now be engaged with, applied to, and adhered upon the side surface 20' of the package, carton, or box 16' as a result of a combination tamp/touch-contact and slidable/wipe-on contact mode. As the package, carton, or box 16' continues to be conveyed downstream by the conveyor 12, the front edge portion thereof will be detected by means of the fourth photoeye or similar sensor 68 whereupon a signal to such effect is transmitted by the photoeye or similar sensor 68 to the central processing unit (CPU) 30. The central processing unit (CPU) 30 then issues a command signal to the rotary actuator 26 so as to cause the actuator arm to be moved from its extended position as illustrated at 22" back to its HOME position as illustrated at 22. The apparatus, machine, or system 10 is then readied for a new label application cycle which is again commenced when a new package, carton, or box 16 is detected by means of the first photoeye or sensor 62.

In connection with the application of the two sepaate labels upon the front and side surfaces 18,20 of the package, carton, or box 16, it is sometimes desirable to alter the location at which the labels are applied to such surfaces of the package, carton, or box 16 so as to in effect correlate the placement of the labels upon such surfaces of the package, carton, or box 16 in conjunction with, for example, the presence or disposition of particular graphics, company logos, and the like, which may already be present upon the front and side surfaces of the package, carton, or box 16 as a result of having been previously printed thereon. A unique structural feature of the apparatus, machine, or system 10 of the present invention resides in the fact that the rotary actuator 26 and the actuator arm 22 are both positionally adjustable so as to adjustably position the actuator arm 22, and the label applicator pad 28 mounted thereon, relative to the rotary actuator 26 and its pivotal or rotary axis so as to achieve such alteration of the location at which the labels can be applied to and upon the front and side surfaces 18,20 of the package, carton, or box 16 while necessarily maintaining the disposition of the label applicator pad 28 at its position adjacent to the label dispensing station 34 of the label printer 36 in order to still receive the printed labels from the label printer 36. Such a system facilitating the adjustable mounting and positioning of the rotary actuator 26 and the actuator arm 22 is illustrated in FIG. 3.

More particularly, as shown in FIG. 3, the actuator arm 22 is adapted to be adjustably mounted upon a support plate 70 by means of a first set of suitable fasteners, not shown, and the support plate 70 is fixedly mounted upon an actuator block 72. The actuator block 72, in turn, is fixedly mounted upon the upper end of the rotary shaft 74 of the rotary actuator 26, and the entire rotary actuator assembly is rotatably mounted within a rotary actuator mounting plate 76. The rotary actuator mounting plate 76 is, in turn, adjustably mounted upon a fixed mounting bar 78 by means of a second set of suitable fasteners, not shown. Consequently, label applicator pad 28, actuator arm 22, support plate 70, actuator block 72, and rotary actuator 26 are rotatably or pivotally mounted as a single unit or entity upon the rotary actuator mounting plate 76. Accordingly, when the relative length of the pivotal or rotatable arm, as defined by means of the distance between the label applicator pad 28 and the rotary axis of the rotary shaft 74 of the rotary actuator 26, is to be altered, the second set of fasteners, not shown, are loosened thereby permitting lineal adjustment of the rotary actuator mounting plate 76, and the entire rotary actuator unit or entity mounted thereon, along and relative to the fixed mounting bar 78 so as to be moved from its position as shown in FIG. 3 to a new position toward the left as considered in FIG. 3. Upon reaching the newly adjusted position, the second set of fasteners, not shown, can be retightened so as to lockingly retain the rotary actuator mounting plate 76, and the entire rotary actuator unit or entity mounted thereon, at its new position upon the fixed mounting bar 78. Since the entire rotary actuator unit or entity comprises, as noted heretofore, the support plate 70, the actuator arm 22, and the label applicator pad 28, the aforenoted adjustable movement of the rotary actuator mounting plate 76 to its new position likewise causes the label applicator pad 28 to be moved to a new position. This movement of the label applicator pad 28 to its new position would ordinarily alter the disposition of the label applicator pad 28 relative to the label dispensing station 34 whereby labels could not be properly dispensed from the label printer 36 and deposited onto the label applicator pad 28. However, as a result of the adjustable mounting of the actuator arm 22 upon the support plate 70 by means of the first set of suitable fasteners, not shown, loosening of the first set of suitable fasteners, not shown, permits the actuator arm 22 to in effect be moved back toward the right as viewed in FIG. 3 to a desired position whereupon retightening of the first set of suitable fasteners, not shown, the actuator arm 22, and the label applicator pad 28 mounted thereon, can be fixedly positioned such that the label applicator pad 28 will be properly located with respect to the label dispensing station 34 of the label printer 36.

With reference still being made to FIG. 3, a mechanism is also operatively associated with the rotary act actuator 26 so as to limit the 90° rotation of the rotary actuator 26 when moving the actuator arm 22 from its aforenoted HOME position to the extended position at which the label applicator pad 28 is positioned to apply a label onto the front surface 18 of the package, carton, or box 16. More particularly, a rotary actuator stop block 80 is fixedly mounted upon the lower end of the rotary actuator shaft 74 and is adapted to be disposed within a housing 82. A top wall 84 of the housing 82 has an aperture 86 defined therein for passage therethrough of the lower end of the rotary actuator shaft 74 so as to permit the disposition of the rotary actuator stop block 80 within the housing 82.

A side wall 88 of the housing 82 has a set screw 90 adjustably mounted therein, and the set screw 90 is adapted to abut the rotary actuator stop block 80 when the actuator arm 22 is disposed at the HOME position so as to effectively limit or arrest the pivotal or rotational movement of the actuator arm 22 and thereby ensure the fact that when the rotary actuator 26 returns the actuator arm 22 to the HOME position, the actuator arm 22 is in fact properly located at the HOME position. A similar set screw or limit stop, not shown, is likewise adapted to be adjustably mounted within a front wall 92 of the housing 82 so as to likewise operatively cooperate with the rotary actuator stop block 80 and thereby properly limit the 90° rotation of the actuator arm 22 when the same is moved from its HOME position to its extended position 22'. It is lastly noted, with respect to the 90° pivotal or rotational movements of the actuator arm 22, that since the actuator arm 22 moves independently, for example, of the fixed mounting bar 78, and since the label applicator pad 28 is mounted directly upon the actuator arm 22, the actuator arm 22 can readily move to its extended position 22' at an elevational level which is just above the upper conveyor surface of the package, carton, or box conveyor 12 such that a label can be applied to, for example, the front or side surface of the package, carton, or box which is at an elevational level which is extremely close to the upper conveyor surface of the package, carton, or box conveyor 12. In this manner, labels can be applied to packages, cartons, or boxes which have relatively small height dimensions.

Figure 4:
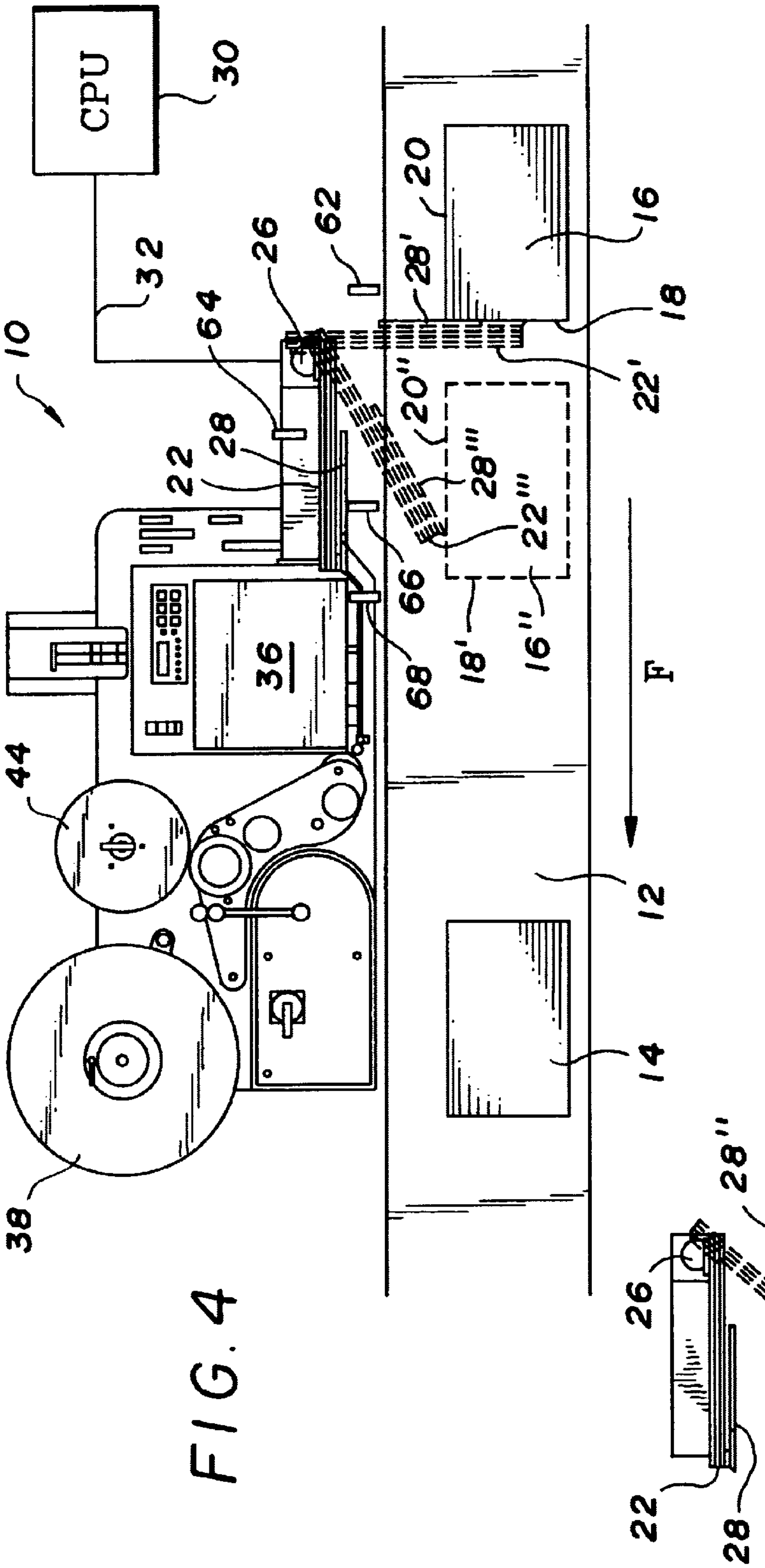
FIG. 4 is a schematic top plan view similar to that of FIGS. 1 and 2 showing, however, the two different positional locations of the actuator arm, relative to the conveyed package, box, or carton, when first and second longitudinally separated printed indicia portions of a single label are being applied to the front and side surfaces of the package, box, or carton in conjunction with the label being applied to a corner region of the package, box, or carton in a wrap-around mode.
Figure 4A:
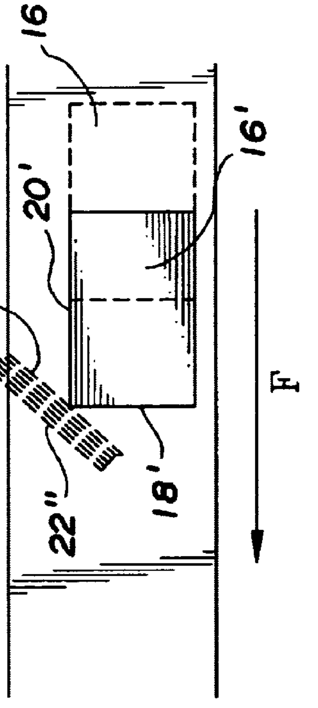
FIG. 4*a* is a partial schematic top plan view of the apparatus, machine, or system of FIG. 4 showing the disposition of the actuator arm as the label is being wrapped around the corner region of the conveyed package, box, or carton.

With reference lastly being made to FIGS. 4 and 4*a,* the operational sequence of the apparatus, machine, or system 10, for applying a single label, having two longitudinally separated label indicia regions printed thereon, onto, for example, the front and side surfaces 18 and 20 of a package, box, or carton 16 such that the label is wrapped around a corner region of the package, box, or carton 16 defined by means of the converging front and side surfaces 18, 20, will now be described. In order to achieve such operational sequence of the apparatus, machine, or system 10 in connection with the application of a single label onto the corner region of the package, carton, or box 16 in the noted wrap-around mode, a simple micro-switch, not shown, is operationally incorporated into the control circuitry of the central processing unit (CPU) 30 so as to effectively alter or quickly change the control circuitry of the central processing unit (CPU) 30 between the first operational mode used in conjunction with the application of two separate labels onto the front and side surfaces 18,20 of the package, box, or carton 16, and the second operational mode used in conjunction with the application of the single label onto the front and side surfaces 18,20 as a result of wrapping the same around the corner region of the package, box, or carton 16. It is further noted that when the control circuitry has been altered or changed so as to enable the achievement of the operational sequence needed to apply a single label onto the front and side surfaces 18,20 as a result of wrapping the same around the corner region of the package, box, or carton 16, the operations of the second and third photoeyes or sensors 64 and 66 are effectively disabled or removed from the control circuit.

More particularly, when the package, carton, or box 16 is conveyed by means of the conveyor 12 in the direction F and the front or forward end or edge of the package, carton, or box 16 is detected by means of the first photoeye or sensor 62, a signal to such effect is transmitted to the central processing unit (CPU) 30, and in response to such signal received by the central processing unit (CPU) 30, the latter issues a command signal for the label printer 36 to print an elongated label having two longitudinally separated label indicia areas printed thereon. The elongated label is then dispensed and adhered upon the label applicator pad 28, and substantially immediately thereafter, that is, within a substantially short predetermined timed period, the central processing unit (CPU) 30 issues an additional command signal to the rotary actuator 26 whereby the rotary actuator 26 causes the actuator arm 22 to be pivoted or rotated through an angular displacement of 90° so as to be moved from its HOME position illustrated at 22 to its first tamp/touch-contact position illustrated at 22' at which the actuator arm 22' and the label applicator pad 28' will be disposed in contact engagement with the front surface 18 of the package, carton, or box 16 such that the distal half of the elongated printed label, having the first label portion printed thereon, will now be engaged with, applied to, and adhered upon the front surface 18 of the package, carton, or box 16 in accordance with a first tamp/touch-contact mode of operation.

Continuing further, as the package, carton, or box 16 continues to be conveyed downstream in the direction F as shown in FIG. 4*a,* the package, carton, or box 16 pushes or forces the actuator arm 22' back from its fully extended 90° position to an intermediate position 22" at which the actuator arm 22" and the label applicator pad 28" operatively cooperate to begin the wrapping of the label around the corner region of the package, carton, or box 16' as defined between the front surface 18' and the side surface 20' of the package, carton, or box 16'. It is to be appreciated that this wrapping mode of the label occurs as a result of movement of the label applicator pad 28" relative to the label which already has its distal end portion adhered to the front surface 18' of the package, carton, or box 16'. Lastly, as the package, carton, or box 16' moves further downstream to the position 16" as seen in FIG. 4, the actuator arm 22''' and the label applicator pad 28''' are forced or caused to be retracted further back toward the HOME position such that the label applicator pad 28''' now causes the proximal end portion of the label, having the second label portion imprinted thereon, to be engaged with, applied to, and adhered upon the side surface 20" of the package, carton, or box 16" in accordance with a second wipe-on contact mode of operation. Lastly, as the package, carton, or box 16" is conveyed still further in the direction F, the front or forward edge portion of the package, carton, or box 16" will be detected by means of the fourth photoeye 68 whereupon a signal being transmitted to the central processing unit (CPU) 30, the central processing unit (CPU) 30 will issue a command signal to the rotary actuator 26 so as to move the actuator arm 22''' back to its HOME position. The apparatus, machine, or system 10 is then readied for a new label application operation or cycle in conjunction with a new upstream package, carton, or box 16.

It is to be appreciated further that in accordance with the operative principles and teachings of the present invention, that regardless of whether two separate labels are to be applied to the front and side surfaces 18,20 of a particular package, carton, or box 16, or alternatively, when a single elongated label, having two longitudinally separated label portions printed thereon, is to be applied to the front and side surfaces 18,20 of the package, carton, or box 16 in a corner wrap-around mode, no need exists for changing the label applicator pad 28. When the smaller labels are printed and dispensed, they are simply deposited upon the distal end portion of the label applicator pad 28, whereas when the larger elongated label is printed and dispensed, the entire support surface of the label applicator pad 28 is utilized for retaining such label thereon. In a similar manner, it is to be further appreciated that while the aforenoted operational description of the apparatus, machine, and system 10 of the present invention has been set forth in connection with the application of labels to the front and side surfaces of a package, carton, or box 16, the apparatus, machine, and system 10 of the present invention is equally applicable to the application or deposition of labels upon any two mutually perpendicular surfaces of a package, carton, or box 16 simply by repositioning the various components of the apparatus, machine, or system 10 such that the actuator arm 22 is capable of being moved within a particularly desired plane. Accordingly, labels can be applied to side and rear surfaces, front and top surfaces, front and bottom surfaces, rear and top surfaces, and rear and bottom surfaces of the package, carton, or box 16. When labels are to be applied to the bottom surfaces of the package, carton, or box 16, a different conveyor 12 will be required to be used, such as, for example, a conveyor employing side rail members for supporting the packages, cartons, or boxes 16 such that the bottom surface of the conveyor 12 is open so as to provide the necessary access to the bottom surface of the package, carton, or box 16 by the actuator arm 22.

Thus, it may be seen that in accordance with the principles and teachings of the present invention, there has been disclosed an apparatus, machine, or system which comprises a single rotary actuator arm mechanism which is capable of operating in two different modes so as to, for example, apply separate labels to two different mutually perpendicular surfaces of a package, carton, or box, or to alternatively apply a single label to two mutually perpendicular surfaces of the package, carton, or box as a result of a corner wrap-around mode of application. In addition, the locations at which the labels can be applied to the surfaces of the package, carton, or box can be predeterminedly altered as desired.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. Apparatus for applying labels to different surfaces of an article being conveyed along a conveyor path, comprising:

an actuating mechanism;

an actuator arm operatively connected to said actuating mechanism; and control means operatively connected to said actuating mechanism for alternatively moving said actuator arm in accordance with two separate and distinct modes of operation, a first mode of operation comprising moving said actuator arm such that said actuator arm can apply two separate labels onto two different surfaces of an article, and a second mode of operation comprising moving said actuator arm such that said actuator arm can apply a single label onto the two different surfaces of the article as a result of wrapping the single label around a corner region of the article as defined by the convergence of the two different surfaces of the article.

2. The apparatus as set forth in claim 1, wherein:

said first mode of operation comprises a dual tamp, touch contact mode of operation whereby two separate labels can be applied onto two different surfaces of an article; and said second mode of operation comprises a single tamp, touch contact and slidable-wipe on contact mode of operation whereby a single label can be applied onto two different surfaces of an article.

3. The apparatus as set forth in claim 1 wherein:

said actuating mechanism comprises a rotary actuating mechanism rotatable about an axis of rotation.

4. The apparatus as set forth in claim 3 wherein:

said rotary actuating mechanism comprises a mechanism selected from the group comprising a rotary actuator, a bell crank mechanism, a rack and pinion mechanism, and a floating wedge mechanism.

5. The apparatus as set forth in claim 3, further comprising:

a label applicator pad, mounted upon a distal end of said actuator arm remote from said axis of rotation of said rotary actuating mechanism, for accommodating a first label having a first relatively small predetermined size for disposition upon one of the two different surfaces of the article, and for accommodating a second label having a second relatively large predetermined size for disposition upon both of the two different surfaces of the article as a result of being wrapped around the corner of the article.

6. The apparatus as set forth in claim 5, further comprising:

means adjustably mounting said actuator arm with respect to said rotary actuating mechanism and said axis of rotation thereof such that the disposition of said label applicator pad of said actuator arm can be positionally adjusted so as to alter the locations at which labels can be deposited onto the surfaces of the article.

7. The apparatus as set forth in claim 6, wherein said means adjustably mounting said actuator arm with respect to said rotary actuating mechanism and said axis of rotation thereof, comprises:

a fixed mounting bar; and a rotary actuating mechanism mounting plate adjustably mounted upon said fixed mounting bar;

said actuator arm being adjustably mounted upon said rotary actuating mechanism mounting plate.

8. The apparatus as set forth in claim 5, further comprising:

a label printer for printing a label and for dispensing the label onto said label applicator pad.

9. The apparatus as set forth in claim 8, wherein said control means for moving said actuator arm in accordance with said first mode of operation comprises:

a first sensor for detecting the presence of the article at a first position along the conveyor path as the article is being conveyed in a predetermined direction along the conveyor path;

a second sensor for sensing the disposition of said actuator arm at a fully retracted position such that said actuator arm is disposed adjacent to said label printer;

a third sensor for detecting the presence of the article at a second position along the conveyor path, located downstream from the first position along the conveyor path, as the article is being conveyed in the predetermined direction along the conveyor path;

a fourth sensor for detecting the presence of the article at a third position along the conveyor path, located downstream from the first and second positions along the conveyor path, as the article is being conveyed in the predetermined direction along the conveyor path; and a central processing unit for issuing a first print command signal to said label printer so as to print a first label and to dispense the first label onto said label applicator pad of said actuator arm in response to receiving a first signal from said first sensor, and for causing said rotary actuating mechanism to rotate said actuator arm to an extended position at which said label applicator pad of said actuator arm transfers the first label onto a first surface of the article; for causing said rotary actuating mechanism to rotate said actuator arm toward said fully retracted position at which said second sensor issues a second signal to said central processing unit confirming the disposition of said actuator arm at said fully retracted position whereupon said central processing unit issues a second print command signal to said label printer so as to print a second label and to dispense the second label onto said label applicator pad of said actuator arm; for causing said rotary actuating mechanism to rotate said actuator arm to an extended position in response to a third signal from said third sensor at which said label applicator pad of said actuator arm transfers the second label onto a second surface of the article; and for causing said rotary actuating mechanism to rotate said actuator arm to said fully retracted position in response to a fourth signal from said fourth sensor such that said actuator arm and said label applicator pad are readied for a subsequent label application operation, whereby said first mode of operation by means of which said actuator arm can apply two separate labels onto two different surfaces of an article has been achieved.

10. The apparatus as set forth in claim 9, wherein:

said first, second, third, and fourth sensors comprise photoeyes.

11. The apparatus as set forth in claim 8, wherein said control means for moving said actuator arm in accordance with said second mode of operation comprises:

a first sensor for detecting the presence of the article at a first position along the conveyor path as the article is being conveyed in a predetermined direction along the conveyor path;

a second sensor for detecting the presence of the article at a second position along the conveyor path, located downstream from the first position along the conveyor path, as the article is being conveyed in the predetermined direction along the conveyor path; and a central processing unit for issuing a print command signal to said label printer so as to print a label and to dispense the label onto said label applicator pad of said actuator arm in response to receiving a first signal from said first sensor; for causing said rotary actuating mechanism to rotate said actuator arm to an extended position at which said label applicator pad of said actuator arm transfers a first portion of the label onto a first surface of the article, wraps the label around a corner region of the article as the article continues to be conveyed along the conveyor path, and transfers a second portion of the label onto a second surface of the article; and for causing said rotary actuating mechanism to rotate said actuator arm to said fully retracted position in response to a second signal from said second sensor such that said actuator arm and said label applicator pad are readied for a subsequent label application operation, whereby said second mode of operation, by means of which said actuator arm can apply a single label onto two different surfaces of an article in accordance with a corner wrap-around operation, has been achieved.

12. The apparatus as set forth in claim 11, wherein:

said first and second sensors comprise photoeyes.

13. Apparatus for applying labels onto at least one surface of an article being conveyed along a conveyor path, comprising: an actuating mechanism disposed within a predetermined orientation;

an actuator arm operatively connected to said actuating mechanism and having a label applicator pad mounted thereon; and means adjustably mounting said actuator arm with respect to said actuating mechanism, while said actuating mechanism is disposed within said predetermined orientation, such that the disposition of said label applicator pad of said actuator arm can be positionally adjusted so as to alter the locations at which labels can be deposited onto the at least one surface of the article.

14. The apparatus as set forth in claim 13, wherein:

said actuating mechanism comprises a rotary actuating mechanism rotatable about an axis of rotation.

15. The apparatus as set forth in claim 14, wherein said means adjustably mounting said actuator arm with respect to said rotary actuating mechanism and said axis of rotation thereof, comprises:

a fixed mounting bar; and a rotary actuating mechanism mounting plate adjustably mounted upon said fixed mounting bar;

said actuator arm being adjustably mounted upon said rotary actuating mechanism mounting plate.

16. The apparatus as set forth in claim 14, wherein:

said rotary actuating mechanism comprises a mechanism selected from the group comprising a rotary actuator, a bell crank mechanism, a rack and pinion mechanism, and a floating wedge mechanism.

17. The apparatus as set forth in claim 14, further comprising:

control means operatively connected to said rotary actuating mechanism for rotatably moving said actuator arm in accordance with a first mode of operation by means of which said actuator arm can apply two separate labels onto two diffferent surfaces of an article, and in accordance with a second mode of operation by means of which said actuator arm can apply a single label onto the two different surfaces of the article as a result of wrapping the single label around a corner region of the article as defined by the convergence of the two different surfaces of the article.

18. The apparatus as set forth in claim 17, wherein:

said first mode of operation comprises a dual tamp, touch contact mode of operation whereby two separate labels can be applied onto two different surfaces of an article; and said second mode of operation comprises a single tamp, touch contact and slidable-wipe on contact mode of operation whereby a single label can be applied onto two different surfaces of an article.

19. The apparatus as set forth in claim 17, further comprising:

wherein said label applicator pad is mounted upon a distal end of said actuator arm remote from said axis of rotation of said rotary actuating mechanism and can accommodate a first label having a first relatively small predetermined size for disposition upon one of the two different surfaces of the article, and can accommodate a second label having a second relatively large predetermined size for disposition upon both of the two different surfaces of the article as a result of being wrapped around the corner of the article.

20. The apparatus as set forth in claim 19, further comprising:

a label printer for printing a label and for dispensing the label onto said label applicator pad.

21. The apparatus as set forth in claim 17, wherein said control means for moving said actuator arm in accordance with said first mode of operation comprises:

a first sensor for detecting the presence of the article at a first position along the conveyor path as the article is being conveyed in a predetermined direction along the conveyor path;

a second sensor for sensing the disposition of said actuator arm at a fully retracted position such that said actuator arm is disposed adjacent to said label printer;

a third sensor for detecting the presence of the article at a second position along the conveyor path, located downstream from the first position along the conveyor path, as the article is being conveyed in the predetermined direction along the conveyor path;

a fourth sensor for detecting the presence of the article at a third position along the conveyor path, located downstream from the first and second positions along the conveyor path, as the article is being conveyed in the predetermined direction along the conveyor path; and a central processing unit for issuing a first print command signal to said label printer so as to print a first label and to dispense the first label onto said label applicator pad of said actuator arm in response to receiving a first signal from said first sensor, and for causing said rotary actuating mechanism to rotate said actuator arm to an extended position at which said label applicator pad of said actuator arm transfers the first label onto a first surface of the article; for causing said rotary actuating mechanism to rotate said actuator arm toward said fully retracted position at which said second sensor issues a second signal to said central processing unit confirming the disposition of said actuator arm at said fully retracted position whereupon said central processing unit issues a second print command signal to said label printer so as to print a second label and to dispense the second label onto said label applicator pad of said actuator arm; for causing said rotary actuating mechanism to rotate said actuator arm to an extended position in response to a third signal from said third sensor at which said label applicator pad of said actuator arm transfers the second label onto a second surface of the article; and for causing said rotary actuating mechanism to rotate said actuator arm to said fully retracted position in response to a fourth signal from said fourth sensor such that said actuator arm and said label applicator pad are readied for a subsequent label application operation, whereby said first mode of operation by means of which said actuator arm can apply two separate labels onto two different surfaces of an article has been achieved.

22. The apparatus as set forth in claim 21, wherein:

said first, second, third, and fourth sensors comprise photoeyes.

23. The apparatus as set forth in claim 17, wherein said control means for moving said actuator arm in accordance with said second mode of operation comprises:

a first sensor for detecting the presence of the article at a first position along the conveyor path as the article is being conveyed in a predetermined direction along the conveyor path;

a second sensor for detecting the presence of the article at a second position along the conveyor path, located downstream from the first position along the conveyor path, as the article is being conveyed in the predetermined direction along the conveyor path; and a central processing unit for issuing a print command signal to said label printer so as to print a label and to dispense the label onto said label applicator pad of said actuator arm in response to receiving a first signal from said first sensor; for causing said rotary actuating mechanism to rotate said actuator arm to an extended position at which said label applicator pad of said actuator arm transfers a first portion of the label onto a first surface of the article, wraps the label around a corner region of the article as the article continues to be conveyed along the conveyor path, and transfers a second portion of the label onto a second surface of the article; and for causing said rotary actuating mechanism to rotate said actuator arm to said fully retracted position in response to a second signal from said second sensor such that said actuator arm and said label applicator pad are readied for a subsequent label application operation, whereby said second mode of operation, by means of which said actuator arm can apply a single label onto two different surfaces of an article in accordance with a corner wrap-around operation, has been achieved.

24. The apparatus as set forth in claim 23, wherein:

said first and second sensors comprise photoeyes.

* * * * *